April 5, 1938. J. B. DICKSON Re. 20,684
RACKET
Original Filed May 26, 1934
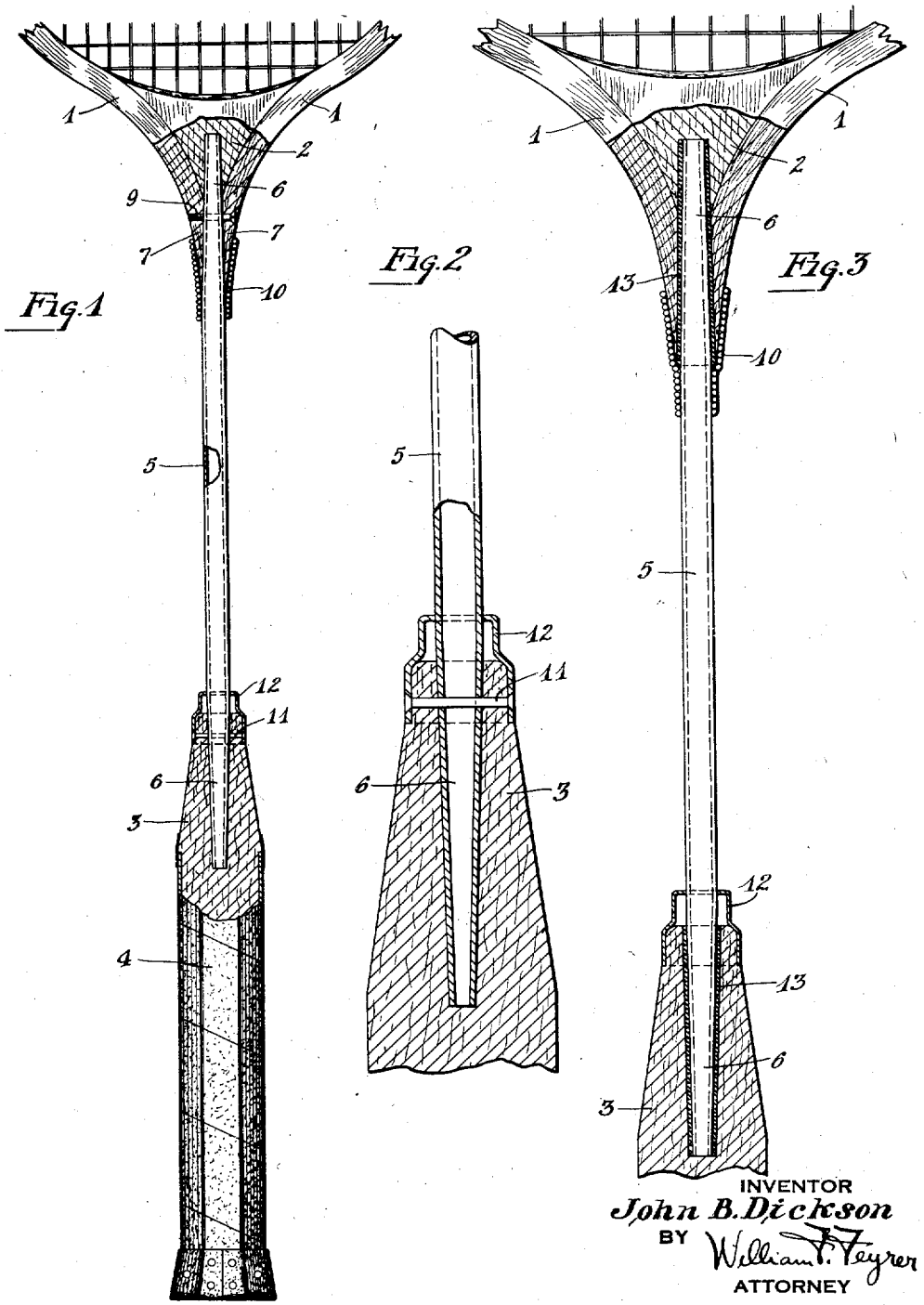
INVENTOR
John B. Dickson
BY William T. Feyrer
ATTORNEY Reissued Apr. 5, 1938

Re. 20,684

UNITED STATES PATENT OFFICE 20,684

RACKET

John B. Dickson, Northampton, Mass., assignor to A. G. Spalding & Bros., New York, N. Y., a corporation of New Jersey Original No. 2,071,684, dated February 23, 1937, Serial No. 727,826, May 26, 1934. Application for reissue January 11, 1938, Serial No. 184,490

3 Claims. (Cl. 273—73)

The invention relates to rackets for the games of badminton, squash, tennis and the like.

It is an object of the invention to provide a highly satisfactory racket having a bow of wood and a tubular shaft of metal.

Another object of the invention is to provide a racket having a wooden head, a tubular metal shaft and a grip, with means to prevent relative turning between the head and the grip, and in which there is provided a firm and twist or torsion resisting connection between the head and the shaft.

In achieving the above objects there is provided as a feature of the invention a racket in which a cloth fabric sleeve is provided for connecting the tubular metal shaft and the wooden bow. In the broader aspects of this invention the fabric sleeve feature is also embodied between the shaft and the grip to further improve the racket.

Another object of the invention is to provide a racket having adequate strength and yet of light weight.

Other objects and features will hereinafter appear.

The invention is shown in the accompanying drawing in which

Figure 1 is a front view of so much of a racket as is necessary to an understanding of my improvement, part of the handle and the bow and throat piece being broken away.

Fig. 2 is an enlarged fragmental detail section of the handle and hollow steel rod.

Fig. 3 is a view similar to Fig. 1 of a modified form of racket.

While the invention has been illustrated as incorporated in a badminton racket it is to be understood that it is equally applicable to squash rackets, tennis rackets and the like.

In the drawing only a portion of the head is shown, the ends of the bow being indicated at 1, the throat piece at 2, and the handle at 3, 4, the latter providing the grip portion. This grip portion of the handle is of wood polygonal in cross section. It may be covered by any suitable slightly yielding grip material wound thereon, or otherwise applied thereto. The portion 5 of the handle lying between the grip member thereof and the head consists of a hollow steel rod, the wall of which is comparatively thin, i. e., about 0.016" in thickness. This rod provides a light weight, strong handle section. Most of the breakage in badminton rackets occurs at this handle section between the grip or hand grasp member of the handle and the head. This intermediate section, if made of wood, must be reduced in thickness to such an extent to keep within the limits of weight that strength must be sacrificed and hence breakage occurs. With the hollow steel rod, however, a reduction in weight, in respect to the minimum of safety in the wooden handle section corresponding to the rod 5, amounts to about ⅜ of an ounce. This steel tubing is tapered at each end as at 6. The upper end lies between the tapered or bevelled ends 7 of the bow, and extends into the throat piece 2. A pin or screw 9, Fig. 1, extends across the joint between these parts, and through the hollow steel rod at a point below the throat piece, i. e., only through the ends of the bow and the intermediate shaft. Suitable wrapping is applied to the joint as shown at 10.

At its lower end the steel tube enters the grip section of the handle, the length of its tapered part where it is held by a pin 11 extending through the grip member, the steel tube, and a ferrule 12.

In Fig. 3, instead of using the cross pin for holding the steel tube to the bow and to the grip member respectively, I employ a sleeve 13 of rubberized fabric glued to the wood of the bow and of the throat piece, and vulcanized to the steel tube. This rubberized sleeve is tapered to conform to the shape of the end of the hollow steel rod. It not only unites the hollow rod to the wooden parts, but also aids in uniting the ends of the wooden bow to the throat piece.

Such a fabric cloth sleeve provides a connection which is especially firm and twist or torsion resisting. Moreover, the sleeve serves to reinforce the entire structure at the juncture of the bow 1, throat piece 2 and shaft rod 5.

The tapered ends of the steel tube are preferably counterparts of each other, so that the tube may be turned end for end in making the assembly, so that either end may be used in connection with either the grip, or the bow.

Additionally, the cloth sleeve 13, because it is a deader material than the metal shaft and the cooperating wooden parts, serves to reduce the vibration or impact shock which would otherwise be transmitted from the head through the steel shaft and grip to the hand or wrist of the user. This advantage is amplified or increased if the sleeve is provided at both ends of the metal shaft.

Variations and modifications may be made within the scope of this invention and portions of the improvements may be used without others.

I claim:

1. A racket comprising a head having a bow of wood, a grip member spaced apart from the bow, and a connection between the bow and grip comprising a single separate tubular metal rod and a cloth fabric sleeve connecting the said tubular metal rod and the wooden bow and united to both.

2. A racket comprising a wooden bow and a throat piece between the bow ends which extend below the throat piece, and with a bore extending upwardly between said bow ends and into the throat piece, a grip member spaced apart from the bow, and a connection between the wooden bow and the throat piece and the grip comprising a single separate tubular metal rod having its end inserted in said bore and secured therein by a cloth fabric sleeve having sufficient vulcanizable material to vulcanize it to the metal rod, said cloth fabric sleeve on its inside being vulcanized to said metal rod and on its outside being adhesively secured to the wooden walls of the bore in the bow ends and throat piece and extending across the joint between them, and thereby reinforcing the entire connection by securing the ends of the bow and the throat piece together as well as securing the tubular metal rod thereto.

3. A racket comprising a head having a bow of wood, a grip member spaced apart from the bow, and a connection between the bow and grip comprising a single separate tubular metal rod, a cloth fabric sleeve connecting said tubular metal rod and the wooden bow and united to both, and a second cloth fabric sleeve connecting the tubular metal rod and the grip and united to both.

JOHN B. DICKSON.